United States Patent [19]
Breuers

[11] 4,022,295
[45] May 10, 1977

[54] ROPE OILER

[75] Inventor: Konrad Karl Breuers, Richmond, Canada

[73] Assignee: Delco Industries Ltd., Richmond, Canada

[22] Filed: Aug. 1, 1975

[21] Appl. No.: 601,138

[52] U.S. Cl. .............................. 184/15 R; 184/102
[51] Int. Cl.² ........................................ F16N 7/12
[58] Field of Search ............ 184/102, 14, 16, 15 R, 184/15 A, 15 B, 22, 25, 85, 90, 91

[56] References Cited
UNITED STATES PATENTS

| | | | |
|---|---|---|---|
| 532,471 | 1/1895 | Mershon | 184/102 X |
| 1,271,376 | 7/1918 | Schondelmaier | 184/22 |
| 1,596,548 | 8/1926 | Osterberg | 184/22 |
| 1,809,492 | 6/1931 | Rowland et al. | 184/102 X |
| 1,897,764 | 2/1933 | Norton | 184/22 |
| 1,944,666 | 1/1934 | Osterberg | 184/22 |
| 2,201,803 | 5/1940 | Todd | 184/15 R |
| 2,205,617 | 6/1940 | Coolidge | 184/102 X |
| 2,341,927 | 2/1944 | Leonard | 184/102 X |
| 3,097,597 | 7/1963 | Visser | 184/102 X |

*Primary Examiner*—Richard C. Pinkham
*Assistant Examiner*—Arnold W. Kramer
*Attorney, Agent, or Firm*—Fetherstonhaugh & Co.

[57] ABSTRACT

A lubricator for running wire ropes having a container adapted to be secured adjacent the rope having a hinged spring-closed cover provided with downwardly turned marginal edge portion for applying pressure against a projecting edge of a wick which extends over a horizontally projecting portion of the front wall of the container so that the wick projects substantially horizontally from the container.

3 Claims, 3 Drawing Figures

U.S. Patent
May 10, 1977
4,022,295
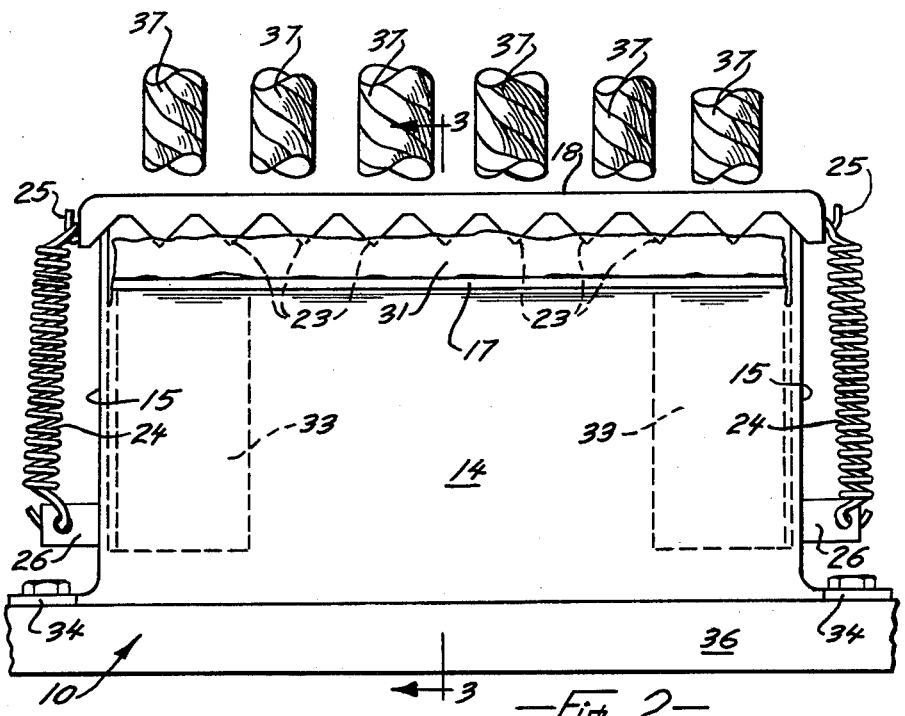
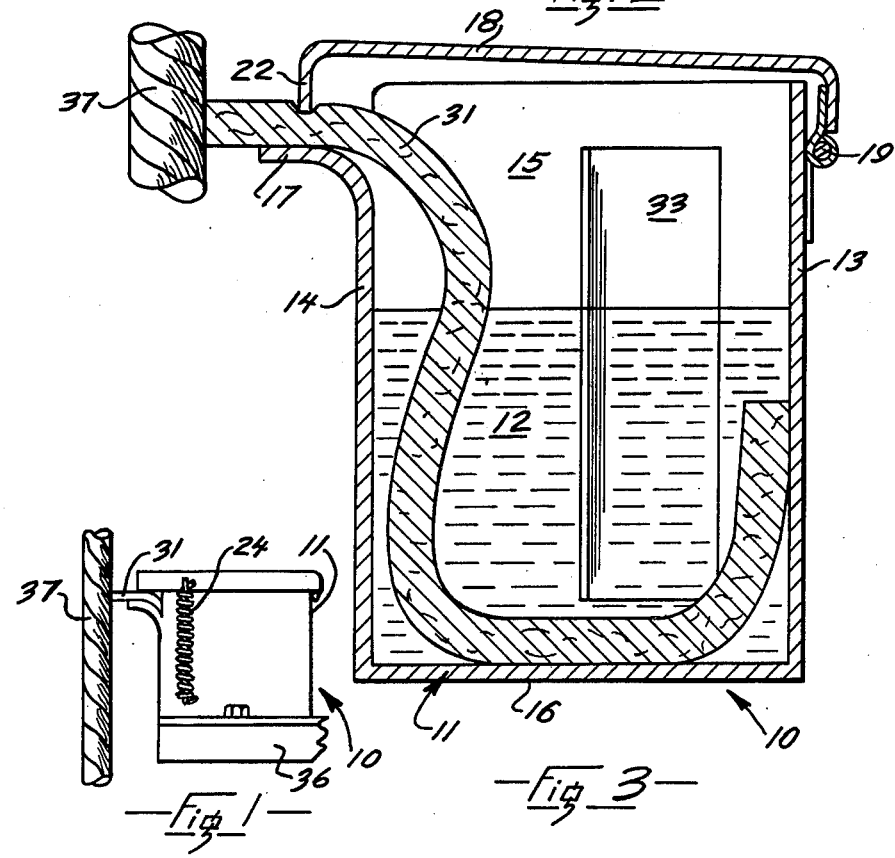
Fig. 1
Fig. 2
Fig. 3

ROPE OILER

BACKGROUND OF THE INVENTION

1. Field of the Invention

This invention relates to lubricating devices, and in particular, to devices for lubricating running wire ropes in elevator shafts and the like.

2. Prior Art

In order to reduce the friction of strands of wire ropes on each other as they pass around sheaves or drums, and also to protect the metal from rusting, the wire ropes must frequently be lubricated. Lubrication also serves to reduce wear on the sheaves.

It is common practice to apply lubricant directly to wire ropes by means of hand-held brushes which are frequently dipped in the lubricant. This is, however, a time consuming operation and, furthermore, usually results in some portions of the wire ropes being over-lubricated and others being under lubricated.

Due to the speed with which wire ropes pass over sheaves and the like, liquid lubricants applied thereto tend to be thrown off by centrifugal force, consequently, it has long been recognized that the ropes should be provided with lubricants continuously during their operation. To this end, lubricators have been devised for automatically applying the lubricant to the wire ropes during the operation thereof. Lubricators developed for this purpose usually have a container carrying a supply of lubricant which is secured adjacent the wire ropes and which is arranged to continuously feed lubricant onto the ropes as they run. In the main, such lubricators have usually had a wick against which the ropes rub and which apply the lubricant during the operation of the elevator. Most of these lubricators utilize a clamp which fixes the wick in the position adjacent the rope, however, clamps used for this purpose have not provided free flow of lubricant through the wick nor have they been devised so as to permit easy and quick adjustment of the wick as it wears out under the rubbing action of the ropes.

SUMMARY OF THE INVENTION

The present invention provides a lubricator for continuously lubricating running wire ropes which has a container adapted to be filled with a liquid lubricant, and mounted adjacent a wire rope to be lubricated, the container having a front wall terminating in an outwardly bent horizontally extending platform over which a felt wick, projecting from the container, extends. A spring-closed cover-plate on the container has a downwardly turned serrated marginal edge portion which engages the wick substantially centrally of the platform so that the projecting portion of the wick extends substantially horizontally.

The present invention provides a lubricator for continuously oiling of running wire rope which is simple and relatively inexpensive to fabricate and which does not inhibit free flow of oil through the wick. The lubricator of the present invention enables quick and easy adjustment of the wick when required.

A detailed description following, related to the drawings, gives exemplification of apparatus and method according to the invention which, however, is capable of expression in method and means other than those particularly described and illustrated.

DESCRIPTION OF THE DRAWINGS

FIG. 1 is an end elevation of the lubricator shown in position confronting a battery of wire ropes, FIG. 2 is an enlarged front elevation of lubricator, FIG. 3 is a section taken on Line 3—3 of FIG. 2.

DETAILED DESCRIPTION

Referring to the drawings, the lubricator of the invention, generally 10, has a container 11 of substantially rectangular cross-section adapted to be filled with a liquid lubricant 12. The container has substantially vertical back and front walls 13 and 14 respectively, substantially vertical side walls 15—15 and a flat bottom wall 16. The front wall is bent outwardly along its upper edge to form a substantially horizontal platform 17 which extends the full length of the container. A cover-plate 18 is hinged at 19 on the back wall and has a downwardly turned front lip 22 which is serrated to provide a plurality of pointed teeth 23. Width of the cover-plate is such that, with the cover-plate in the closed position, the lip 22 extends substantially centrally over the platform 17.

A pair of tension springs 24—24 are looped at the upper ends thereof over outwardly turned hook members 25—25 on the cover-plate. These springs are also looped at their lower ends through tab members 26—26 projecting from the side walls 15 whereby to resiliently maintain the cover-plate in the closed position as shown in the drawings. The spring arrangement illustrated in FIGS. 1 and 2 is preferred but obviously other arrangements will serve the same purpose.

The lubricator is provided with a wick 31 which, as shown, is a felt sheet the, width of which is substantially the same as the inside width of the container. The wick is positioned so as to project out of the container across the platform with a free edge of the wick overhanging the platform. The wick 31 extends inside the container beneath a pair of vertically disposed angle brackets 33—33 secured, as by welding, to the inner surfaces of the end walls 15. Pressure of the teeth 23 against the wick presses the latter against the platform 17 so that the wick projects substantially horizontally out of the container. Furthermore, the teeth bite into the wick so as to prevent its accidental withdrawal from or retraction into the container.

The container 11 has a pair of ears 34—34 extending sideways from the bottom wall, the ears being provided with suitable slotted openings (not shown) enabling the container to be bolted to a portion of the elevator frame 36 confronting a battery of wire ropes 37 to be lubricated, enabling fine adjustment of the container so that a projecting portion of the wick engages all the wire ropes.

The lubricator, it is seen, provides continuous lubrication and cleaning of the ropes as they run during operation of the elevator.

At each inspection, the position of the wick relative to the ropes can be easily adjusted by either loosening the bolts which secure the container 11 to the frame 36 and sliding the entire lubricator towards the ropes or simply by lifting the cover-plate against the springs and pulling the wick outwards to the required position. Construction of the lubricator, it is seen, does not impede flow of oil through the wick as only the points of the teeth are engaged with the wick and, furthermore, although the wick is firmly held against moving in or out of the container, adjustment of the wick is a simple matter.

Wear of the wick will take place only at the point of contact with the wire ropes. The wick, therefore, will wear to form an embracing groove for each wire rop so that, eventually, the wick will contact each of the ropes over substantially one-half of the circumference thereof. Lubrication and cleaning of the ropes will, therefore, improve with the use of the lubricator.

I claim:

1. A lubricator for wire ropes comprising:
   a. a container adapted to hole a quantity of liquid lubricant, the container having front and back walls,
   b. the front wall having an outwardly extending horizontal portion so as to provide a flat horizontal platform,
   c. a wick extending over the platform and into the container into the lubricant therein,
   d. a cover-plate hingedly connected to the back wall of the container and having a downwardly extending lip along a front edge thereof adapted to engage the wick along a line substantially centrally of the platform, and
   e. means connecting the cover-plate and container normally holding the cover-plate with its lip against the wick so as to prevent movement of the wick into or out of the container.

2. A lubricant as claimed in claim 1 in which the downward extending lip of the cover-plate is serrated to provide a plurality of teeth for engaging the wick.

3. A lubricator as claimed in claim 1 including a pair of brackets mounted in the container and spaced from the bottom thereof for holding the wick in the lubricant within the container.

* * * * *